(12) United States Patent
Ozluturk

(10) Patent No.: US 8,064,719 B2
(45) Date of Patent: Nov. 22, 2011

(54) METHOD AND APPARATUS TO CORRECT DIGITAL IMAGE BLUR DUE TO MOTION OF SUBJECT OR IMAGING DEVICE

(76) Inventor: Fatih M. Ozluturk, Port Washington, NY (US)

( * ) Notice: Subject to any disclaimer, the term of this patent is extended or adjusted under 35 U.S.C. 154(b) by 618 days.

(21) Appl. No.: 12/274,074

(22) Filed: Nov. 19, 2008

(65) Prior Publication Data

US 2009/0128639 A1     May 21, 2009

Related U.S. Application Data

(63) Continuation of application No. 11/089,081, filed on Mar. 24, 2005.

(60) Provisional application No. 60/556,230, filed on Mar. 25, 2004.

(51) Int. Cl.
*G06K 9/40*     (2006.01)

(52) U.S. Cl. ............................ 382/275; 706/22; 369/103

(58) Field of Classification Search ........................ None
See application file for complete search history.

(56) References Cited

U.S. PATENT DOCUMENTS

| | | | |
|---|---|---|---|
| 4,612,575 A | 9/1986 | Ishman et al. | |
| 4,890,160 A | 12/1989 | Thomas | |
| 5,170,255 A | 12/1992 | Yamada et al. | |
| 5,189,518 A | 2/1993 | Nishida | |
| 5,193,124 A | 3/1993 | Subbarao | |
| 5,262,867 A | 11/1993 | Kojima | |
| 5,264,846 A | 11/1993 | Oikawa | |
| 5,291,300 A | 3/1994 | Ueda | |
| 5,627,543 A | 5/1997 | Moreira | |
| 5,652,918 A | 7/1997 | Usui | |
| 5,666,158 A | 9/1997 | Sekine et al. | |
| 5,706,402 A * | 1/1998 | Bell | 706/22 |
| 5,712,474 A | 1/1998 | Naneda | |
| 5,729,290 A | 3/1998 | Tokumitsu et al. | |
| 5,734,739 A | 3/1998 | Sheehan et al. | |

(Continued)

FOREIGN PATENT DOCUMENTS

EP     1004983 A1 *  5/2000

(Continued)

OTHER PUBLICATIONS

Banham, et al., Digital Image Restoration, IEEE Signal Processing Magazine, Mar. 1997, pp. 24-41.

(Continued)

*Primary Examiner* — Anand Bhatnagar
*Assistant Examiner* — Tsung-Yin Tsai
(74) *Attorney, Agent, or Firm* — Volpe and Koenig, P.C.

(57) ABSTRACT

Signal processing techniques are applied to digital image data to remove the distortion caused by motion of the camera, or the movement of the subject being photographed, or defective optics, or optical distortion from other sources. When the image is captured, the effect of relative motion between the camera and the subject is that it transforms the true image into a blurred image according to a 2-dimensional transfer function. The 2-dimensional transfer function representing the motion is derived using blind estimation techniques or by using information from sensors that detect the motion. The transfer function is inverted and used to define a corrective filter. The filter is applied to the image and the blur due to the motion is removed, restoring the correct image. Another embodiment uses the transfer function to avoid blur by combining multiple consecutive images taken at a fast shutter speed.

12 Claims, 9 Drawing Sheets

U.S. PATENT DOCUMENTS

| | | | |
|---|---|---|---|
| 5,867,213 | A | 2/1999 | Ouchi |
| 5,982,421 | A | 11/1999 | Inou et al. |
| 6,067,367 | A | 5/2000 | Nakajima et al. |
| 6,124,864 | A | 9/2000 | Madden et al. |
| 6,166,384 | A | 12/2000 | Dentinger et al. |
| 6,166,853 | A | 12/2000 | Sapia et al. |
| 6,195,460 | B1 | 2/2001 | Kobayashi et al. |
| 6,342,918 | B1 | 1/2002 | Inou et al. |
| 6,349,114 | B1 * | 2/2002 | Mory ................... 375/240.21 |
| 6,353,689 | B1 | 3/2002 | Kanamaru et al. |
| 6,466,262 | B1 | 10/2002 | Miyatake et al. |
| 6,512,807 | B1 | 1/2003 | Pohlman et al. |
| 6,583,823 | B1 | 6/2003 | Shimada et al. |
| 6,745,066 | B1 | 6/2004 | Lin et al. |
| 6,757,434 | B2 | 6/2004 | Miled et al. |
| 6,759,979 | B2 | 7/2004 | Vashisth et al. |
| 6,781,623 | B1 | 8/2004 | Thomas |
| 6,909,914 | B2 | 6/2005 | Pedrizzetti et al. |
| 6,993,204 | B1 | 1/2006 | Yahil et al. |
| 7,024,050 | B2 | 4/2006 | Kondo et al. |
| 7,162,102 | B2 | 1/2007 | Cahill et al. |
| 7,397,500 | B2 | 7/2008 | Yost et al. |
| 7,693,563 | B2 | 4/2010 | Suresh et al. |
| 2001/0028798 | A1 | 10/2001 | Manowitz et al. |
| 2002/0094200 | A1 | 7/2002 | Yamaguchi |
| 2002/0110268 | A1 | 8/2002 | Brinker et al. |
| 2003/0076408 | A1 | 4/2003 | Dutta |
| 2003/0113035 | A1 | 6/2003 | Cahill et al. |
| 2003/0118227 | A1 | 6/2003 | Winsor et al. |
| 2003/0174899 | A1 | 9/2003 | Kondo et al. |
| 2004/0091158 | A1 | 5/2004 | Miled et al. |
| 2004/0100561 | A1 | 5/2004 | Shinohara et al. |
| 2004/0218055 | A1 | 11/2004 | Yost et al. |
| 2005/0231603 | A1 | 10/2005 | Poon |
| 2005/0286388 | A1 * | 12/2005 | Ayres et al. ................... 369/103 |
| 2006/0177145 | A1 | 8/2006 | Lee et al. |
| 2007/0031004 | A1 | 2/2007 | Matsui et al. |
| 2007/0086675 | A1 | 4/2007 | Chinen et al. |

FOREIGN PATENT DOCUMENTS

| | | | |
|---|---|---|---|
| JP | | 11024122 | 1/1999 |
| JP | | 2000207538 A * | 7/2000 |
| JP | | 2004056581 | 2/2004 |
| JP | | 2004056581 A | 2/2004 |
| JP | | 2004104652 | 4/2004 |
| JP | | 2004104652 A | 4/2004 |

OTHER PUBLICATIONS

Kundur, et al., Blind Image Deconvolution, IEEE Signal Processing Magazine, May 1996, pp. 43-64.

Yitzhaky, et al., Comparison of Direct Blind Deconvolution Methods for Motion-Blurred Images, Applied Optics, vol. 38, No. 20, Jul. 1999, pp. 4325-4332.

Yitzhaky et al., Comparison of Direct Blind Deconvolution Methods for Motion-Blurred Images, Applied Optics, vol. 38, No. 20, Jul. 1999, pp. 4325-4332.

Biemond et al., "Iterative Methods for Image Deblurring," Proceedings of the IEEE, May 1990, vol. 78, No. 5.

\* cited by examiner

| $r(n+N,m+M)$ | ... | | $r(n,m+M)$ | | ... | $r(n-N,m+M)$ |
|---|---|---|---|---|---|---|
| | | | ... | | | |
| | | | $r(n,m+1)$ | | | |
| $r(n+N,m)$ | ... | $r(n+1,m)$ | $r(n,m)$ | $r(n-1,m)$ | ... | $r(n-N,m)$ |
| | | | $r(n,m-1)$ | | | |
| | | | ... | | | |
| $r(n+N,m)$ | ... | | $r(n,m-M)$ | | ... | $r(n-N,m-M)$ |

Figure 1

| $w(N,M)$ | ... | | $w(0,M)$ | | ... | $w(-N,M)$ |
|---|---|---|---|---|---|---|
| | | | ... | | | |
| | | | $w(0,1)$ | | | |
| $w(N,0)$ | ... | $w(1,0)$ | $w(0,0)$ | $w(-1,0)$ | ... | $w(-N,0)$ |
| | | | $w(0,-1)$ | | | |
| | | | ... | | | |
| $w(N,0)$ | ... | | $w(0,-M)$ | | ... | $w(-N,-M)$ |

Figure 2

| $r(n+N+1,m+M)$ | ... | | $r(n+1,m+M)$ | | ... | $r(n-N+1,m+M)$ |
|---|---|---|---|---|---|---|
| | | | ... | | | |
| | | | $r(n+1,m+1)$ | | | |
| $r(n+N+1,m)$ | ... | $r(n+2,m)$ | $r(n+1,m)$ | $r(n,m)$ | ... | $r(n-N+1,m)$ |
| | | | $r(n+1,m-1)$ | | | |
| | | | ... | | | |
| $r(n+N+1,m)$ | ... | | $r(n+1,m-M)$ | | ... | $r(n-N+1,m-M)$ |

Figure 3

Subject       Image sensor

METHOD AND APPARATUS TO CORRECT DIGITAL IMAGE BLUR DUE TO MOTION OF SUBJECT OR IMAGING DEVICE

CROSS REFERENCE TO RELATED APPLICATION

This application is a continuation of U.S. patent application Ser. No. 11/089,081, filed on Mar. 24, 2005, which claims priority from U.S. Provisional Application No. 60/556,230, filed on Mar. 25, 2004, all of which are incorporated by reference as if fully set forth.

FIELD OF INVENTION

The present invention generally relates to digital image processing. More specifically, this invention relates to processing of digitized image data in order to correct for image distortion caused by relative motion between the imaging device and the subject at the time of image capture, or by optical distortion from other sources.

BACKGROUND

When capturing images, as with a camera, it is desirable to capture images without unwanted distortion. In general, sources of unwanted distortion can be characterized as equipment errors and user errors. Examples of common equipment errors include inadequate or flawed optical equipment, and undesirable characteristics of the film or other recording media. Using equipment and media of a quality that is suitable for a particular photograph can help mitigate the problems associated with the equipment and the recording medium, but in spite of this, image distortion due to equipment errors can still appear.

Another source of image distortion is user error. Examples of common user errors include poor image processing, and relative motion between the imaging device and the subject of the image. For example, one common problem that significantly degrades the quality of a photograph is the blur that results from camera movement (i.e. shaking) at the time the photograph is taken. This can be difficult to avoid, especially when a slow shutter speed is used, such as in low light conditions, or when a large depth of field is needed and the lens aperture is small. Similarly, if the subject being photographed is moving, use of a slow shutter speed can also result in image blur.

There are currently many image processing techniques that are used to improve the quality, or "correctness," of a photograph. These techniques are applied to the image either at the time it is captured by a camera, or later when it is post-processed. This is true for both traditional "hardcopy" photographs that are chemically recorded on film, and for digital photographs that are captured as digital data, for example using a charged couple device (CCD) or a CMOS sensor. Also, hardcopy photographs can be scanned and converted into digital data, and are thereby able to benefit from the same digital signal processing techniques as digital photographs.

Commonly used post-processing techniques for digitally correcting blurred images typically involve techniques that seek to increase the sharpness or contrast of the image. This can give the mistaken impression that the blur is remedied. However, in reality, this process causes loss of data from the original image, and also alters the nature of the photograph. Thus, current techniques for increasing the sharpness of an image do not really "correct" the blur that results from relative motion between a camera and a subject being photographed. In fact, the data loss from increasing the sharpness can result in a less accurate image than the original. Therefore, a different method that actually corrects the blur is desirable.

In the prior art, electromechanical devices for correcting image blur due to camera motion are built into some high quality lenses, variously called "image stabilization", "vibration reduction", or similar names by camera/lens manufacturers. These devices seek to compensate for the camera/lens movement by moving one or more of the lens elements; hence countering the effect of the motion. Adding such a device to a lens typically makes the lens much more expensive, heavier and less sturdy, and can also compromise image quality.

Accordingly, it is desirable to have a technique that corrects for distortion in photographs without adding excessively to the price, robustness or weight of a camera or other imaging device, or adversely affecting image quality.

SUMMARY

The present invention processes image data in order to correct an image for distortion caused by imager movement or by movement of the subject being imaged. In another embodiment, the present invention can prevent image distortion due to motion of the imaging device or subject at relatively slow shutter speeds, resulting in a substantially undistorted image.

In another embodiment, the present invention measures relative motion between the imaging device and the subject by using sensors that detect the motion. When an image is initially captured, the effect of relative motion between the imaging device and the subject is that it transforms the "true image" into a blurred image, according to a 2-dimensional transfer function defined by the motion. The invention determines a transfer function that represents the motion and corrects the blur.

In yet another embodiment, the transfer function is estimated using blind detection techniques. The transfer function is then inverted, and the inverted function is implemented in an image correcting filter that essentially reverses the blurring effect of the motion on the image. The image is processed through the filter, wherein blur due to the motion is reversed, and the true image is recovered.

In yet another embodiment, the invention uses the transfer function to combine consecutive images taken at a fast shutter speed to avoid blur due to motion between camera and subject that could result from using a slow shutter speed. In still another embodiment, the image sensor is moved to counter camera motion while the image is being captured.

BRIEF DESCRIPTION OF THE DRAWINGS

FIG. 1 is a portion of memory having memory locations wherein elements of a recorded image are stored.

FIG. 2 is a portion of memory having memory locations wherein elements of a deconvolution filter are stored.

FIG. 3 is a portion of memory having memory locations wherein the recorded image is stored for calculating the next value of a corrected image.

DETAILED DESCRIPTION OF THE PREFERRED EMBODIMENTS

Figure 4:
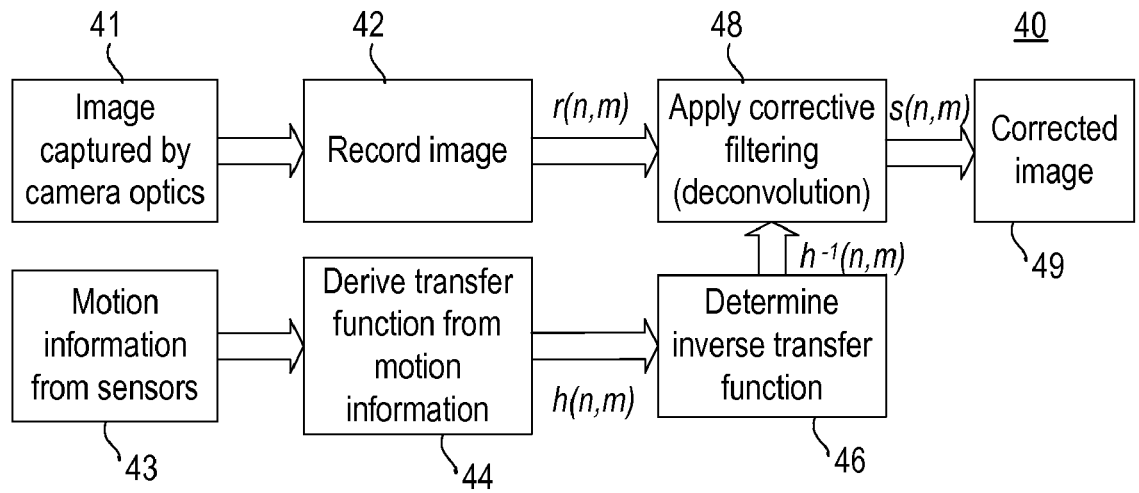
FIG. 4 is a functional block diagram of a system for correcting an image for distortion using a transfer function representing the distortion, wherein the transfer function is derived from measurements of the motion that caused the distortion.

The present invention will be described with reference to the figures wherein like numerals represent like elements throughout. Although the invention is explained hereinafter as a method of correcting for image distortion due to the shaking of a camera when a picture is taken, similar distortions can also be caused by other types of imaging equipment and by imperfections in photo processing equipment, movement of the subject being photographed, and other sources. The present invention can be applied to correct for these types of distortions as well. Additionally, although reference is made throughout the specification to a camera as the exemplary imaging device, the present invention is not limited to such a device. As aforementioned, the teachings of the present invention may be applied to any type of imaging device, as well as image post-processing techniques.

Capturing and recording a photograph, for example by a camera, involves gathering the light reflected or emanating from a subject, passing it through an optical system, such as a series of lenses, and directing it onto a light sensitive recording medium. A typical recording medium in traditional analog photography is a film that is coated with light sensitive material. During processing of the exposed film, the image is fixed and recorded. In digital cameras, the recording medium is typically a dense arrangement of light sensors, such as a Charge-Coupled Device (CCD) or a CMOS sensor.

The recording medium continuously captures the impression of the light that falls upon it as long as the camera shutter is open. Therefore, if the camera and the subject are moving with respect to each other (such as in the case when the user is unsteady and is shaking the camera, or when the subject is moving), the recorded image becomes blurred. To reduce this effect, a fast shutter speed can be used, thereby reducing the amount of motion occurring while the shutter is open. However, this reduces the amount of light from the subject captured on the recording medium, which can adversely affect image quality. In addition, increasing the shutter speed beyond a certain point is not always practical. Therefore, undesired motion blur occurs in many pictures taken by both amateur and professional photographers.

The nature of the blur is that the light reflected from a reference point on the subject does not fall on a single point on the recording medium, but rather it 'travels' across the recording medium. Thus a spread-out, or smudged, representation of the reference point is recorded.

Generally, all points of the subject move together, and the optics of the camera and the recording medium also move together. For example, in the case of a photograph of a moving car, wherein an image of the car is blurred due to uniform motion of all parts of the car. In other words, the image falling on the recording medium 'travels' uniformly across the recording medium, and all points of the subject blur in the same manner.

The nature of the blur resulting from uniform relative motion can be expressed mathematically. In a 2-dimensional space with discrete coordinate indices 'n' and 'm', the undistorted image of the subject can be represented by s(n,m), and a transfer function h(n,m) can be used to represent the blur. Note that h(n,m) describes the way the image 'travels' on the recording medium while it is captured. The resulting image that is recorded, r(n,m), is given by:

$$r(n,m) = s(n,m) ** h(n,m); \quad \text{Equation (1)}$$

where ** represents 2-dimensional convolution. The mathematical operation of convolution is well known to those skilled in the art and describes the operation:

$$r(n, m) = \sum_{i=-\infty}^{\infty} \sum_{j=-\infty}^{\infty} h(i, j) s(n-i, m-j). \quad \text{Equation (2)}$$

In the sum operations in Equation (2), the summation limits are infinite. In practice, the summations are not infinite, since the support region of the transfer function is finite. In other words, the region where the function is non-zero is limited by the time the camera shutter is open and the amount of motion. Therefore, the summation is calculated for only the indices of the transfer function where the function itself is non-zero, for example, from i=-N ... N and j=-M ... M.

If the transfer function h(n,m) is known, or its estimate is available, the blur that it represents can be "undone" or compensated for in a processor or in a computer program, and a corrected image can be obtained, as follows. Represent the "reverse" of the transfer function h(n,m) as $h^{-1}(n,m)$ such that:

$$h(n,m) ** h^{-1}(n,m) = \delta(n,m); \quad \text{Equation (3)}$$

where δ(n,m) is the 2-dimensional Dirac delta function, which is:

$$\delta(n, m) = \begin{cases} 1 & \text{if } n = m = 0 \\ 0 & \text{otherwise} \end{cases}. \quad \text{Equation (4)}$$

The delta function has the property that when convolved with another function, it does not change the nature of that function. Therefore, once h(n,m) and hence $h^{-1}(n,m)$ are known, an image r(n,m) can be put through a correcting filter, called a "deconvolution filter", which implements the inverse transfer function $w(n,m) = h^{-1}(n,m)$ and undoes the effect of blur. Then:

$$r(n, m)  w(n, m) = r(n, m)  h^{-1}(n, m) \quad \text{Equation (5)}$$

$$= s(n, m)  h(n, m)  h^{-1}(n, m)$$

$$= s(n, m) ** \delta(n, m)$$

$$= s(n, m);$$

and the correct image data s(n,m) is recovered.

The deconvolution filter in this example is such that:

$$\sum_{i=-N}^{N}\sum_{j=-M}^{M} w(i, j)h(n-i, m-j) = \begin{cases} 1 & \text{if } n = m = 0 \\ 0 & \text{otherwise} \end{cases} \quad \text{Equation (6)}$$

Because of the property that the deconvolution operation forces the output of the convolution to be zero for all but one index, this method is called the "zero-forcing algorithm". The zero-forcing algorithm itself is but one method that can be used, but there are others possible also, such as the least mean-square algorithm described in more detail below.

In order to define a deconvolution filter, the transfer function h(n,m) representing the relative motion between the imager and the subject must be derived from measuring the motion, or alternatively by using blind estimation techniques. The inverse function $h^{-1}$(n,m) must then be calculated and incorporated in a filter to recover a corrected image s(n,m). It is possible to determine h(n,m) using sensors that detect motion, and record it at the time the image is captured.

One embodiment of the present invention includes one or more motion sensors, attached to or included within the imager body, the lens, or otherwise configured to sense any motion of the imager while an image is being captured, and to record this information. Such sensors are currently commercially available which are able to capture movement in a single dimension, and progress is being made to improve their accuracy, cost, and characteristics. To capture motion in two dimensions, two sensors may be used, each capable of detecting motion in a single direction. Alternatively, a sensor able to detect motion in more than one dimension can be used.

The convolution in Equation (5) can be performed using memory elements, by performing an element-by-element multiplication and summation over the support region of the transfer function. The recorded image is stored, at least temporarily, in memory elements forming a matrix of values such as shown in FIG. 1. Similarly, the deconvolution filter w(n,m) is stored in another memory location as shown in FIG. 2. The deconvolution operation is then performed by multiplying the values in the appropriate memory locations on an element-by-element basis, such as multiplying r(n,m) and w(0,0); r(n−1,m) and w(1,0), and so on, and summing them all up.

Element-by-element multiplication and summing results in the convolution:

$$y(n, m) = \sum_{i=-N}^{N}\sum_{j=-M}^{M} w(i, j)r(n-i, m-j). \quad \text{Equation (7)}$$

To calculate the next element, y(n+1,m) for example, the deconvolution filter w(n,m) multiplies the shifted memory locations, such as shown in FIG. 3, followed by the summation. Note that the memory locations do not need to be shifted in practice; rather, the pointers indicating the memory locations would move. In FIG. 1 and FIG. 3 portions of r(n,m) are shown that would be included in the element-by-element multiplication and summation, and this portion is the same size as w(n,m). However, it should be understood that r(n,m), that is the whole image, is typically much larger than the support region of w(n,m). To determine value of the convolution for different points, an appropriate portion of r(n,m) would be included in the calculations.

The filter defined by Equation (5) is ideal in the sense that it reconstructs the corrected image from the blurred image with no data loss. A first embodiment calculates the inverse of h(n,m) where h(n,m) is known. As explained above, by making use of motion detecting devices, such as accelerometers, the motion of the imager (such as a camera and/or the associated lens) can be recorded while the picture is being captured, and the motion defines the transfer function describing this motion.

A functional block diagram of this embodiment in accordance with the present invention is illustrated in FIG. 4, wherein a method 40 for correcting image distortion is shown. An image r(n,m) from camera optics is captured by an imager (step 41) and recorded in memory (step 42). Simultaneously, motion sensors detect and record camera motion (step 43) that occurs while the shutter of the camera is open. The transfer function representing the motion h(n,m) is derived (step 44), and the inverse transfer function $h^{-1}$(n,m) is determined (step 46). The inverse transfer function is applied in a corrective filter (step 48) to the image, which outputs a corrected image s(n,m) (step 49).

In this and other embodiments that make use of motion sensors to represent the imager's movement, derivation of the transfer function from motion information (step 44) takes into account the configuration of the imager and the lens also. For an imager that is a digital camera, for example, the focal length of the lens factors into the way the motion of the imager affects the final image. Therefore the configuration of the imager is part of the derivation of h(n,m). This is important especially for imagers with varying configurations, such as digital cameras with interchangeable lenses.

In this first embodiment of the invention, an iterative procedure is used to compute the inverse transfer function from h(n,m). The approximate inverse transfer function at iteration k is denoted as $\hat{h}_k^{-1}$(n,m). At this iteration, output of the deconvolution filter is:

$$y_k(n, m) = \hat{h}_k^{-1}(n, m) ** r(n, m) \quad \text{Equation (8)}$$

$$= \sum_i \sum_j \hat{h}_k^{-1}(i, j)r(n-i, m-j).$$

The filter output can be written as the sum of the ideal term and the estimation noise as:

$$y_k(n, m) = h^{-1}(n, m) ** r(n, m) + \quad \text{Equation (9)}$$

$$\left(\hat{h}_k^{-1}(n, m) - h^{-1}(n, m)\right) ** r(n, m)$$

$$= s(n, m) + v_k(n, m);$$

where υ(n,m) is the estimation noise which is desirable to eliminate. An initial estimate of the correct image can be written as:

$$\hat{s}_k(n,m) = \hat{h}_k^{-1}(n,m) ** r(n,m). \quad \text{Equation (10)}$$

Figure 6:
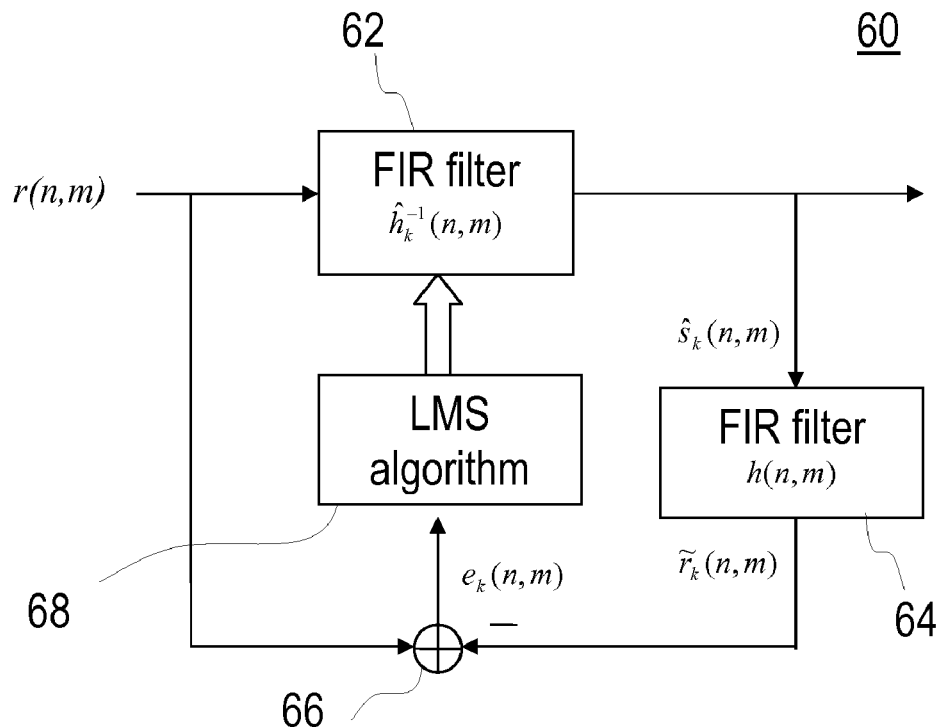
- FIG. 6 shows a unit for iterative calculation of the corrective filter coefficients and estimation of the correct image data.

However, this estimate can in general be iteratively improved. There are a number of currently known techniques described in estimation theory to achieve this. A preferable option is the Least Mean-Square (LMS) algorithm. A block diagram of a calculation unit 60 which implements this method is shown in FIG. 6.

As an initial state, $\hat{h}_0^{-1}(n,m)$ is set to equal $\mu r(n,m)$. Then, the following steps are iteratively repeated:

Step 1, an estimate of the correct image is calculated in a first 2-dimensional finite impulse response (2D FIR) filter 62:

$$\hat{s}_k(n,m) = \hat{h}_k^{-1}(n,m) ** r(n,m).$$

Step 2, a received signal based on the estimated correct image is calculated in a second 2D FIR filter 64:

$$\tilde{r}_k(n,m) = \hat{s}_k(n,m) ** h(n,m);$$

and the estimation error is calculated using an adder 66:

$$e_k(n,m) = r_k(n,m) - \tilde{r}_k(n,m).$$

Step 3, the inverse transfer function coefficients are then updated in the LMS algorithm unit 68:

$$\hat{h}_{k+1}^{-1}(n,m) = \hat{h}_k^{-1}(n,m) + \mu r(n,m) e_k(n,m);$$

where $\mu$ is the step-size parameter.

These steps are repeated until the estimation error becomes small enough to be acceptable; which value can be predetermined or may be set by a user. As the iterative algorithm converges, the estimated inverse transfer function approaches the correct inverse transfer function $h^{-1}(n,m)$. The inverse transfer function coefficients are the coefficients of the deconvolution filter, and the estimate $\hat{s}(n,m)$ converges to $s(n,m)$, the correct image, at the same time.

This process can be repeated for the entire image, but it is less complex, and therefore preferable, to find the inverse filter first over a single transfer function support region, then apply it to the entire image $r(n,m)$.

Figure 7:
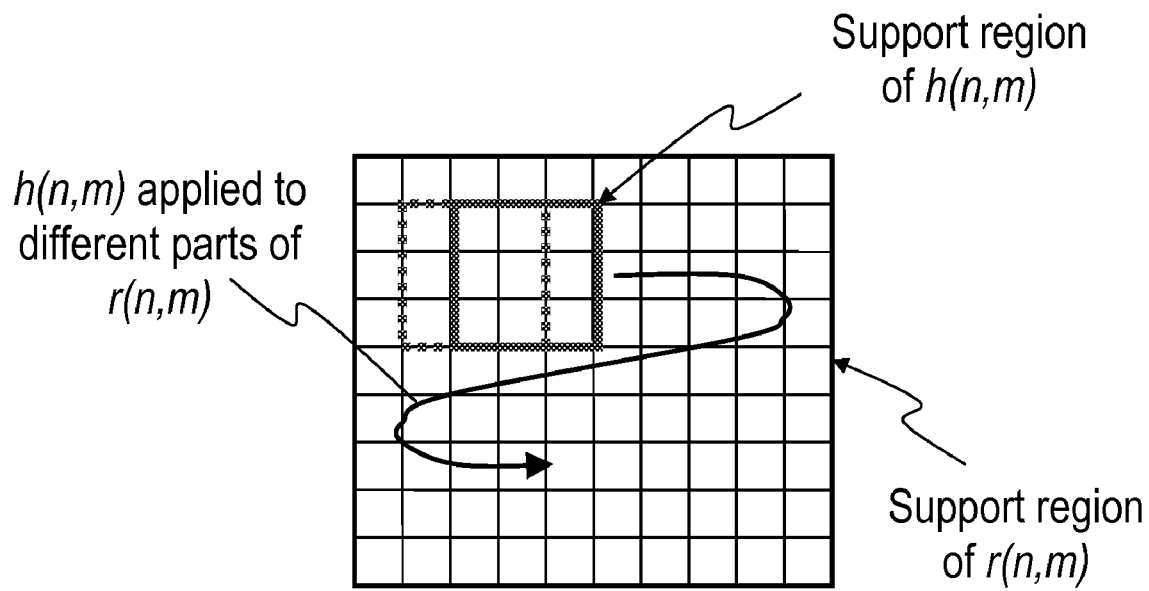
FIG. 7 illustrates support regions of an image r(n,m) and of a transfer function h(n,m), and the transfer function h(n,m) being applied to different parts of the image r(n,m).

While the above Steps 1-3 are being repeated, a different portion of the recorded image $r(n,m)$ can be used in each iteration. As in FIG. 7, it should be noted that the recorded image $r(n,m)$ typically has a much larger support region than the transfer function $h(n,m)$ that represents the camera motion. Therefore, the above steps are preferably performed over a support region of $h(n,m)$, and not over the entire image $r(n,m)$, for each iteration.

Although the present invention has been explained with reference to the LMS algorithm, this is by way of example and not by way of limitation. It should be clear to those skilled in the art that there are other iterative algorithms beside the LMS algorithm that can be used to achieve acceptable results, and also that there are equivalent frequency domain derivations of these algorithms. For example, it is possible to write Equation (1) in frequency domain as:

$$R(\omega_1,\omega_2) = S(\omega_1,\omega_2) H(\omega_1,\omega_2); \quad \text{Equation (11)}$$

where $R(\omega_1,\omega_2)$, $S(\omega_1,\omega_2)$, and $H(\omega_1,\omega_2)$ are the frequency domain representations (Fourier Transforms) of the captured image, the correct image, and the transfer function, respectively, and therefore:

$$S(\omega_1, \omega_2) = \frac{R(\omega_1, \omega_2)}{H(\omega_1, \omega_2)}. \quad \text{Equation (12)}$$

To obtain $s(n,m)$ one would calculate $S(\omega_1,\omega_2)$ as above and take the Inverse Fourier Transform, which should be known to those skilled in the art. However, this method does not always lead to well behaved solutions, especially when numerical precision is limited.

Figure 5:
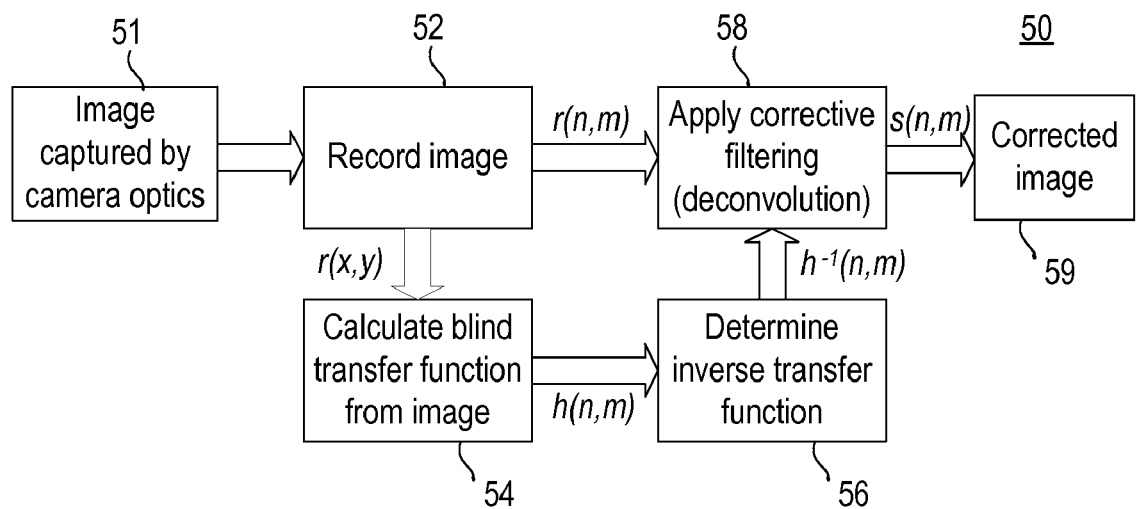
FIG. 5 is a functional block diagram of a system for correcting an image for distortion using a transfer function rep

In a second embodiment of the present invention, $h(n,m)$ is not known. This second embodiment uses so-called blind deconvolution, whereby the transfer function $h(n,m)$ is estimated using signal processing techniques. A functional block diagram of this embodiment is illustrated in FIG. 5, wherein a method 50 for correcting image distortion according to this embodiment is shown. An image $r(n,m)$ from the optics from a camera is captured (step 51) and recorded in memory (step 52). Unlike the first embodiment, there are no motion sensors to detect and record camera motion that occurs while the shutter of the camera is open. Instead, the transfer function representing the motion $h(n,m)$ is derived using blind estimation techniques (step 54), and the inverse transfer function $h^{-1}(n,m)$ is determined (step 56). The inverse transfer function is applied in a corrective filter to the image (step 58), which outputs a corrected image $s(n,m)$ (step 59).

Blind equalization techniques are used to obtain the deconvolution filter coefficients. This is also an iterative LMS algorithm, similar to that used in the first embodiment. In this second embodiment, an iterative procedure is also used to compute an approximate deconvolution filter, and the approximation is improved at each iteration until it substantially converges to the ideal solution. As aforementioned with respect to the first embodiment, the level of convergence may be predetermined or may be set by a user. The approximate deconvolution filter is denoted at iteration k as $\hat{w}_k(n,m)$. At this iteration, the output of the deconvolution filter is:

$$y_k(n,m) = \hat{w}_k(n,m) ** r(n,m) \quad \text{Equation (13)}$$
$$= \sum \sum \hat{w}_k(i,j) r(n-i, m-j);$$

The filter output can be written as the sum of the ideal term and the estimation noise as:

$$y_k(n,m) = w(n,m) ** r(n,m) + \quad \text{Equation (14)}$$
$$[\hat{w}_k(n,m) - w(n,m)] ** r(n,m)$$
$$= s(n,m) + v_k(n,m);$$

where $\upsilon(n,m)$ is the estimation noise, which is desirable to eliminate. An initial estimate of the correct image can be written as:

$$\hat{s}_k(n,m) = \hat{w}_k(n,m) ** r(n,m). \quad \text{Equation (15)}$$

Figure 8:
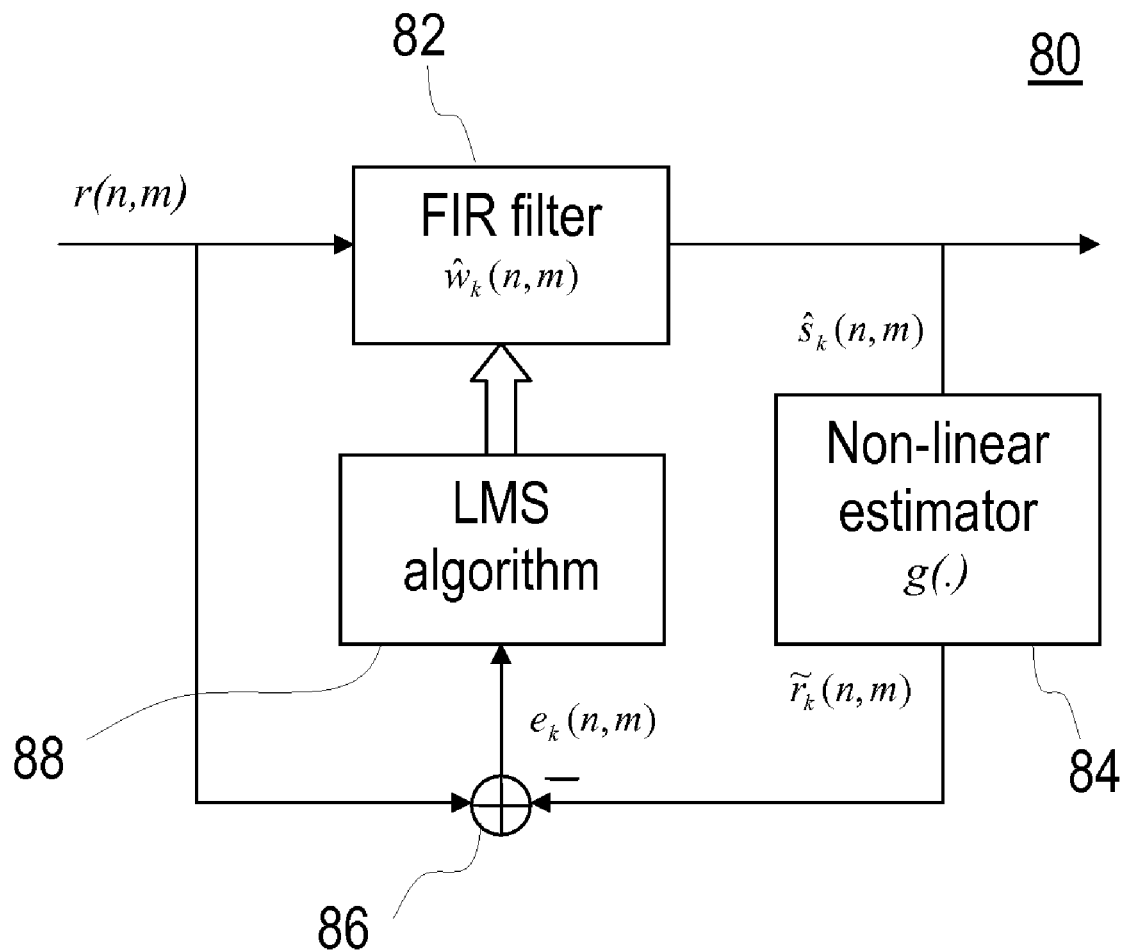
FIG. 8 shows a unit for blind deconvolution to calculate the correct image data.

However, this estimate can be iteratively improved. There are a number of currently known techniques described in estimation theory to achieve this. A preferable option is the LMS algorithm. A block diagram of a calculation unit 80 which implements this method is shown in FIG. 8.

As an initial state, $\hat{h}_0^{-1}(n,m)$ is set equal to $\mu r(n,m)$. Then, the following steps are iteratively repeated:

Step 1, an estimate of the correct image is calculated in a first 2D FIR filter 82:

$$\hat{s}_k(n,m) = \hat{h}_k^{-1}(n,m) ** r(n,m).$$

Step 2, a received signal based on the estimated correct image is calculated in a non-linear estimator 84:

$$\tilde{r}_k(n,m) = g(\hat{s}_k(n,m));$$

and the estimation error is calculated using an adder 86:

$$e_k(n,m) = r_k(n,m) - \tilde{r}_k(n,m).$$

Step 3, the inverse transfer function coefficients are then updated in the LMS algorithm unit 88:

$$\hat{h}_{k+1}^{-1}(n,m) = \hat{h}_k^{-1}(n,m) + \mu r(n,m) e_k(n,m),$$

where $\mu$ is the step-size parameter.

The function g(.) calculated in step 2 is a non-linear function chosen to yield a Bayes estimate of the image data. Since this function is not central to the present invention and is well known to those of skill in the art, it will not be described in detail hereinafter.

There are known blind detection algorithms for calculating s(n,m) by looking at higher order statistics of the image data r(n,m). A group of algorithms under this category are called Bussgang algorithms. There are also variations called Sato algorithms, and Godard algorithms. Another class of blind estimation algorithms use spectral properties (polyspectra) of the image data to deduce information about h(n,m). Any appropriate blind estimation algorithm can be used to determine h(n,m), and to construct a correcting filter.

The first two embodiments of the present invention described hereinbefore correct blur in an image based on determining a transfer function that represents the motion of an imager while an image is being captured, and then correcting for the blur by making use of the "inverse" transfer function. One method determines the transfer function at the time the photograph is being captured by using devices that can detect camera motion directly. The other method generates a transfer function after the image is captured by using blind estimation techniques. Both methods then post-process the digital image to correct for blur. In both cases, the captured image is originally blurred by motion, and the blur is then removed.

Figure 9:
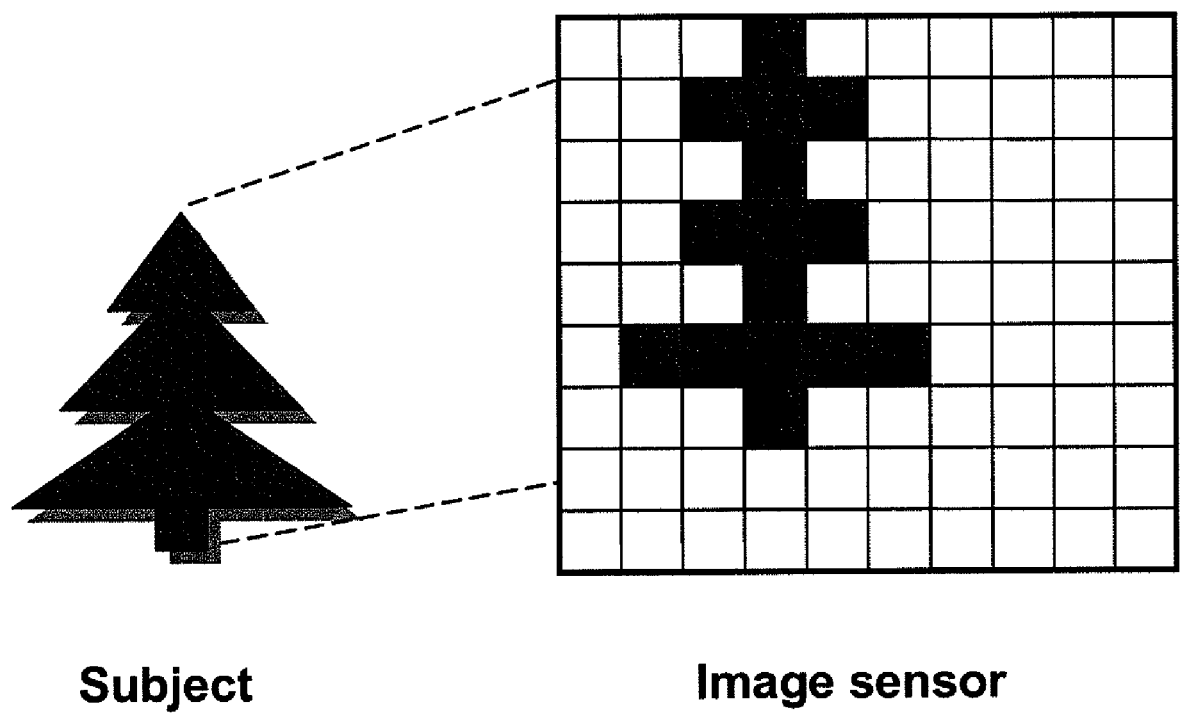
FIG. 9 is an image of an object being captured on an image sensor wherein pixel values represent points of the image.

In accordance with a third embodiment of the present invention the blurring of an image is prevented as it's being captured, as described below. When an imager is moved while an image is being captured, multiple copies of the same image are, in effect, recorded over each other. For example, when an image is captured digitally it is represented as pixel values in the sensor points of the image sensor. This is pictorially represented in FIG. 9, in which the imager (for example, a camera and its associated lens) are not shown in order to simplify the depiction.

Figure 10:
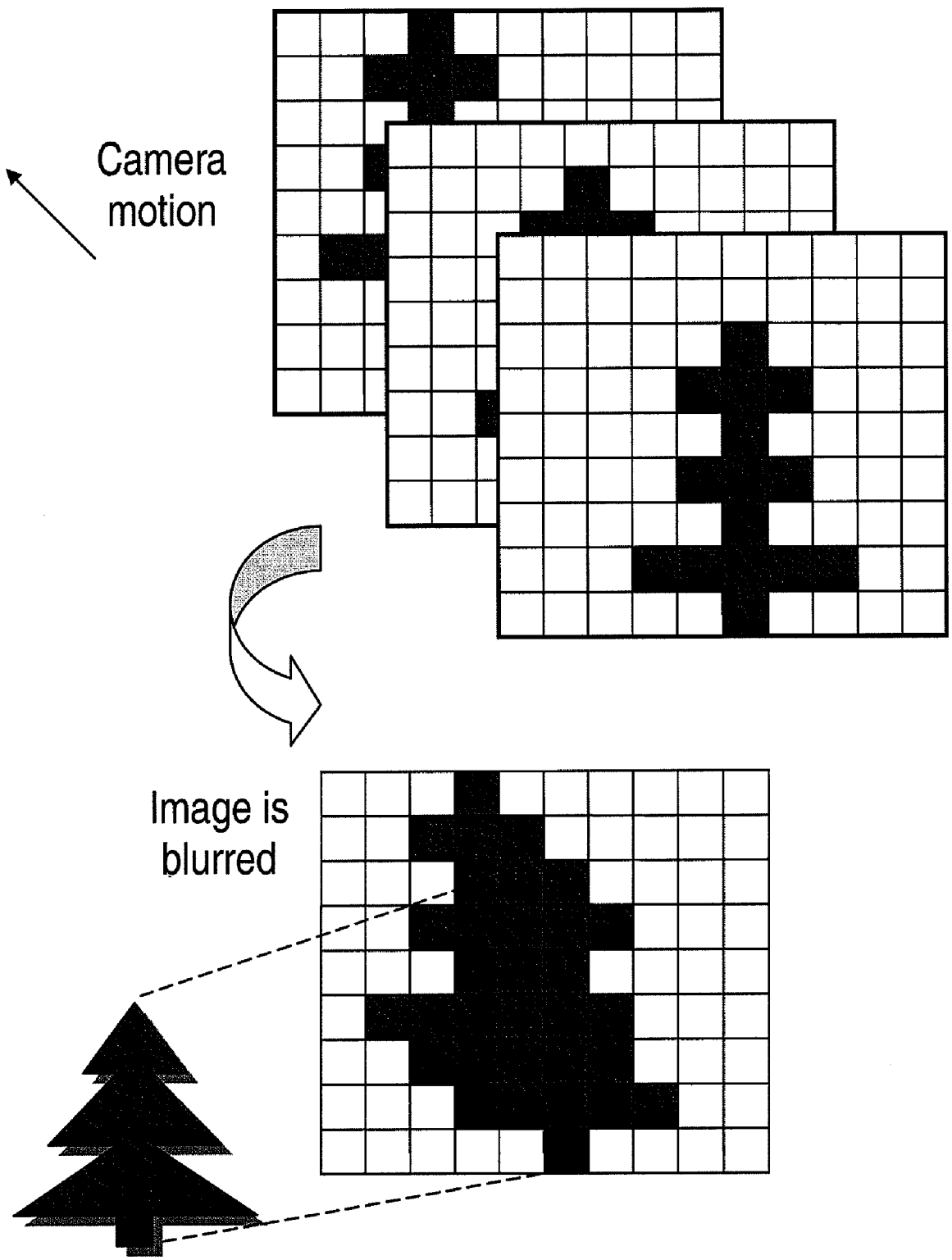
FIG. 10 illustrates the effect of moving an imager while capturing an image, resulting in multiple copies of the image being recorded over each other, causing blur.

If the imager is shaken or moved while the image is being captured, the situation is equivalent to copies of the same image being captured multiple times in an overlapping fashion with an offset. The result is a blurred image. This is particularly true if the shutter speed is relatively slow compared to the motion of the camera. This is graphically illustrated in FIG. 10.

Figure 11:
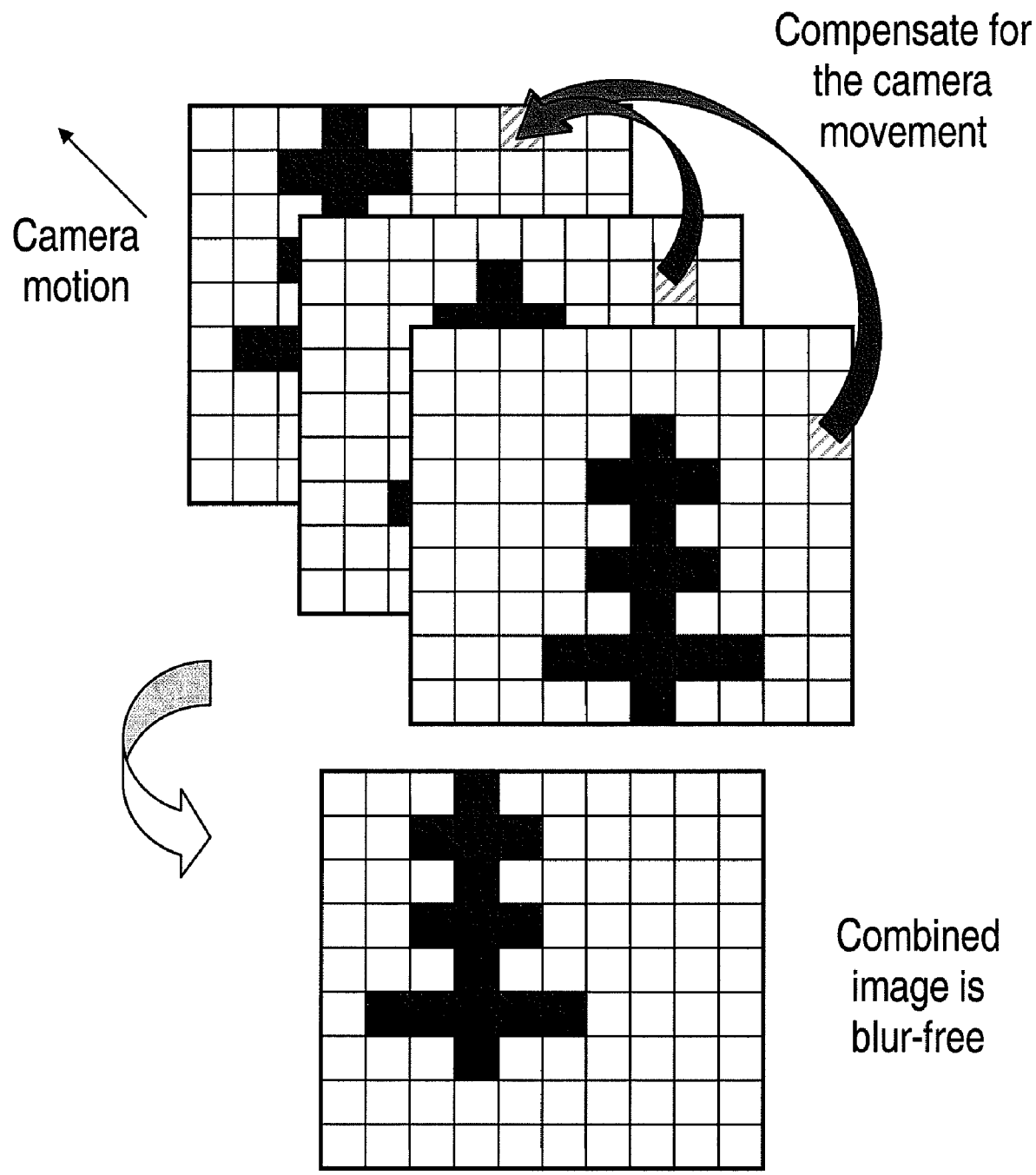
FIG. 11 illustrates combining images taken at fast shutter speeds to result in the equivalent of a final image taken at a slower shutter speed, but with reduced blur.

When the shutter speed is sufficiently fast compared to the motion of the imager, blur does not occur or is very limited because the displacement of the imager is not large enough to cause the light reflected from a point on the image to fall onto more than one point on the image sensor. This third embodiment of the invention takes advantage of the ability of an imager to record multiple images using fast shutter speeds. When an image is being captured using a setting of a relatively slow shutter speed, the imager actually operates at a higher shutter speed (for instance at the fastest shutter speed at which the imager is designed to operate), and captures multiple images "back to back." For example, if the photograph is being taken with a shutter speed setting of $\frac{1}{125}$ sec and the fastest shutter speed of the camera is $\frac{1}{1000}$ sec, the camera actually captures 8 consecutive images, each taken with a shutter speed setting of $\frac{1}{1000}$ sec. Then, the camera combines the images into a single image by aligning them such that each pixel corresponding to the same image point in each image is combined pixel-by-pixel into one pixel value by adding pixel values, averaging them, or using any other appropriate operation to combine them. The multiple images can all be stored and aligned once all of them are captured, or alternatively, each image can be aligned and combined with the first image in "real time" without the need to store all images individually. The blur of the resulting image is substantially reduced, as depicted in FIG. 11.

The quality of an image can be measured in terms of signal-to-noise power ratio (SNR). When a fast shutter speed is used, the SNR of the image is degraded because the image sensor operates less effectively when the amount of light falling on it is reduced. However, since multiple images are being added, this degradation is overcome. Indeed, an SNR improvement can be expected using this embodiment, because the image data is being added coherently while the noise is being added non-coherently. This phenomenon is the basis for such concepts as maximal ratio combining (MRC).

To determine how to align the pixel values, a device that can detect motion, such as an accelerometer or other motion sensor, is attached to or incorporated within the imager, and it records the motion of the imager while the photograph is being taken. The detected motion indicates how much the imager moved while each of the series of images was captured, each image having been captured back-to-back with a high shutter speed as explained in the example above. The imager moves each of the images in the series by an amount which is preferably measured in pixels, in the direction opposite the motion of the imager that occurred during the interval between the capture of the first image and each respective image in the series. Thus, the shift of each image is compensated for, and the correct pixels are aligned in each of the images. This is illustrated in FIG. 11. The combined image will not be blurred since there is no spilling of image points into more than one pixel in the combined final image.

As an alternative to the third embodiment, the reference point for aligning the higher speed images is not the imager location, but the subject itself. In other words, higher shutter speed images can be aligned and combined such that a designated subject in a field of view is clear and sharp whereas other parts of the image may be blurred. For example, a moving subject such as a car in motion can be the designated subject. If high shutter speed images are combined such that the points of the image of the moving car are aligned, the image of the car will be clear and sharp, while the background is blurred. As a way to align a designated subject, such as the car in this example, pattern recognition and segmentation algorithms may be used that are well known to those skilled in the art, and defined in current literature. Alternatively, a tracking signal that is transmitted from the subject can be used to convey its position. Alternatively, the user can indicate, such as by an indicator in a viewfinder, which object in the field of view is the designated subject to be kept blur-free.

Figure 12:
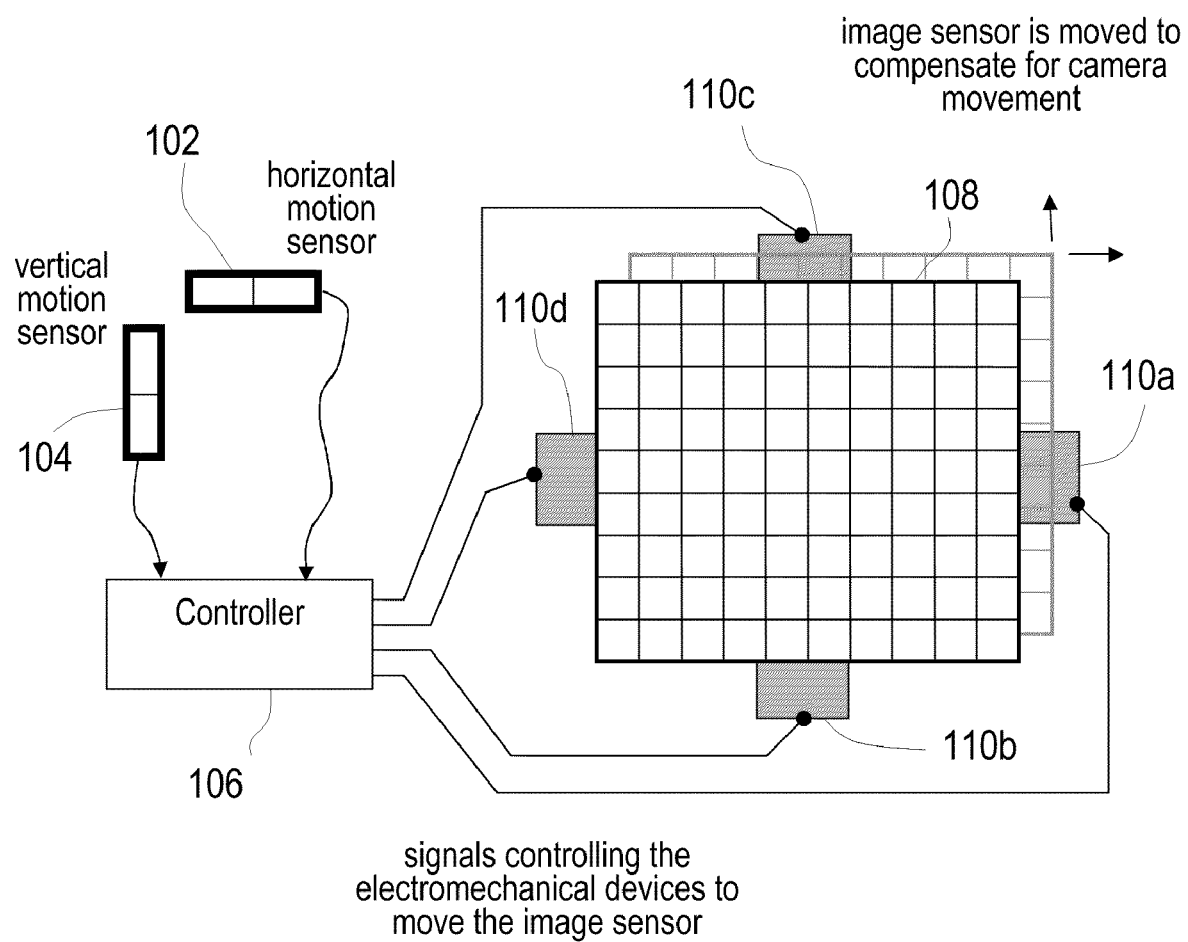
FIG. 12 illustrates image blur correction where an image sensor is moved to compensate for imager movement.

A fourth embodiment of the invention compensates for movement of the imager or the subject by adjusting the position of the image sensor during image capture, according to the inverse of the transfer function describing the imager or subject motion, or both. This embodiment is illustrated in FIG. 12. This embodiment is preferably used in digital cameras wherein the image sensor 108 is a relatively small component and can be moved independently of the camera, but can also be used with film. Accordingly, this embodiment makes use of motion sensors, and detects the movement of the camera and/or the subject while the image is being captured. The signals from the motion sensors are used to control devices that adjust the position of the image sensor. In FIG. 12, horizontal motion sensor 102 and vertical motion sensor 104 measure movement of the camera while its shutter (not shown) is open and an image is being captured. The motion information is conveyed to a controller 106, which determines and sends signals to devices 110a, 110b, 110c, and 110d, which adjust the position of the image sensor 108. The control mechanism is such that the devices 110a-d, for example electromagnets or servos, move the image sensor 108 in the opposite direction of the camera motion to prevent motion blur. Additional sensors (not shown) can be used to detect motion of the subject, and the control mechanism configured to correct for that motion as well.

Figure 13:
FIG. 13 is an example of an image distorted by movement of the imager when the image was captured.
Figure 14:
FIG. 14 is represents the image of FIG. 13 corrected according to the present invention.

FIG. 13 shows an example of a photographic image that is blurred due to user movement of the imager while taking the picture. FIG. 14 shows the same image, corrected according to the present invention. The invention substantially recovers the correct image from the blurred image.

Those skilled in the art will recognize that all embodiments of the invention are applicable to digitized images which are blurred by uniform motion, regardless of the source of the image or the source of the motion blur. It is applicable to digital images blurred due to motion of the imager, of the subject, or both. In some cases, it is also applicable to images captured on film and then scanned into digital files. In the latter case, however, motion sensor information typically may not be available, and therefore only the blind estimation embodiment can be used. Also, where appropriate, the different embodiments of the invention can be combined. For example, the superposition embodiment can be used to avoid most blur, and the correcting filter using blind estimation embodiment can then be applied to correct the combined image for any remaining blur.

In describing the invention, no distinction has been made between an imager that captures images one at a time, such as a digital camera, and one that captures sequence of images, such as digital or analog video recorders. A digital video recorder or similar device operates substantially the same way as a digital camera, with the addition of video compression techniques to reduce the amount of image data being stored, and various filtering operations used to improve image quality. The invention is also applicable to digital and analog video capture and processing, being applied to each image in the sequence of images, and can be used in conjunction with compression and other filtering.

The implementation of the apparatus that performs the restoration of the images to their correct form can be done as part of the imager capturing the image, or it can be done as a post-process. When done as part of the imager, the image correcting apparatus can be implemented in an integrated circuit, or in software to run on a processor, or a combination of the two. When done as a post process, a preferred embodiment is that the image data is input into a post processing device such as a computer, and the blind estimation algorithm is performed by a computer program. In this embodiment, the implementation could be a dedicated computer program, or an add-on function to an existing computer program.

Where a computer program performs the image restoration, a blind estimation algorithm can be executed by the program to calculate the estimated transfer function h(n,m). Alternatively, motion information can be recorded by the camera at the time the image is captured, and can be downloaded into the program to be used as an input to calculate h(n,m). In either case, the program then derives the correcting filter and applies the filter to correct the image.

It should also be noted that if there are multiple blurred objects in an image, and the blur is caused by the objects moving in different directions, the image of each object will be blurred differently, each blurred object having a different transfer function describing its motion. The present invention can allow the user to individually select independently blurred parts of the image and individually correct only the selected parts, or alternatively, to correct a selected part of the image at the expense of the rest of the image, resulting in a blur-corrected subject and a blurred background.

When increased accuracy is needed in obtaining h(n,m), those skilled in the art will recognize that, in some cases, the motion information from sensors can be used to calculate h(n,m), and an estimate of h(n,m) can also be calculated by blind estimation and the two transfer functions can be advantageously combined for more accurate results.

There are other signal processing algorithms and digital filters which can be applied to digital images in order to improve their color saturation, reduce noise, adjust contrast and sharpness, etc. These can be incorporated as part of an imager, such as a digital camera, or as part of a post-processing application, such as a photo editing software running on a computer. It should be clear to those skilled in the art that those techniques can be applied in addition to the distortion correction of this invention.

What is claimed is:

1. A method, comprising:
    a recording medium in an imager recording image data that represents an image;
    a motion sensor measuring motion information while the recording medium is capturing the image data, wherein the motion information indicates motion of the imager;
    a processor determining a transfer function based on the motion information;
    the processor determining an initial state for an inverse transfer function;
    the processor updating the inverse transfer function using an iterative technique, wherein the iterative technique includes, for each of a plurality of iterations:
        determining a first estimate of the image data based on the inverse transfer function and a finite impulse response (FIR) filter;
        determining a second estimate of the image data based on the first estimate of the image data and the transfer function;
        determining an estimation error parameter by comparing the second estimate of the image data and the image data; and
        updating the inverse transfer function based on the estimation error parameter and a step-size parameter;
    the processor determining a deconvolution filter based on the inverse transfer function; and
    the processor filtering the image data using the deconvolution filter.

2. The method of claim 1, wherein the iterative technique further includes, for one or more of the plurality of iterations:
    determining whether to perform a next iteration based on the estimation error parameter.

3. The method of claim 1, wherein the inverse transfer function includes one or more coefficients, and wherein the updating the inverse transfer function includes updating the one or more coefficients.

4. The method of claim 1, wherein the motion information is two-dimension motion information, and wherein the motion information includes linear horizontal motion information and linear vertical motion information.

5. The method of claim 1, wherein the transfer function represents motion in a portion of the image data that is smaller than the entire image data, and wherein the processor filtering the image data using the deconvolution filter is performed on the entire image data.

6. The method of claim 1, wherein the method is performed in a digital camera.

7. An apparatus, comprising:
a recording medium configured to record image data;
a motion sensor configured to measure motion information while the recording medium is capturing the image data, wherein the motion information indicates motion of the apparatus; and
a processor configured:
to determine a transfer function based on the motion information;
to determine an initial state for an inverse transfer function;
to update the inverse transfer function using an iterative technique, wherein the iterative technique includes, for each of a plurality of iterations:
determining an estimate of the image data based on the inverse transfer function and a finite impulse response (FIR) filter;
determining a second estimate of the image data based on the estimate of the image data and the transfer function;
determining an estimation error parameter by comparing the second estimate of the image data and the image data; and
updating the inverse transfer function based on the estimation error parameter and a step-size parameter;
to determine a deconvolution filter based on the inverse transfer function; and
to filter the image data using the deconvolution filter.

8. The apparatus of claim 7, wherein the iterative technique further includes, for one or more of the plurality of iterations:
determining whether to perform a next iteration based on the estimation error parameter.

9. The apparatus of claim 7, wherein the inverse transfer function includes one or more coefficients, and wherein the processor is configured to update the inverse transfer function by updating the one or more coefficients.

10. The apparatus of claim 7, wherein the motion information is two-dimension motion information, and wherein the motion information includes linear horizontal motion information and linear vertical motion information.

11. The apparatus of claim 7, wherein the transfer function represents motion in a portion of the image data that is smaller than the entire image data, and wherein the processor is configured to filter the image data using the deconvolution filter by filtering the entire image data.

12. The apparatus of claim 7, wherein the apparatus is a digital camera.

* * * * *